United States Patent [19]

Mori et al.

[11] Patent Number: 5,743,601
[45] Date of Patent: Apr. 28, 1998

[54] VEHICLE ANTILOCK BRAKE CONTROL DEVICE

[75] Inventors: Hisayoshi Mori; Kei Fukuyo, both of Hamakita, Japan

[73] Assignee: Nisshinbo Industries, Inc., Tokyo, Japan

[21] Appl. No.: 596,034

[22] Filed: Feb. 6, 1996

[30] Foreign Application Priority Data

Feb. 17, 1995 [JP] Japan .................................. 7-053242

[51] Int. Cl.⁶ .................................................. B60T 8/58
[52] U.S. Cl. ................... 303/187; 303/116.1; 303/113.5
[58] Field of Search ............................ 303/113.5, 187, 303/186, 188, 116.1, 116.2

[56] References Cited

U.S. PATENT DOCUMENTS 5,021,957  6/1991  Yosino et al. ............... 303/113.5 X
5,441,336  8/1995  Takeuchi ...................... 303/116.1
5,445,445  8/1995  Yukio ........................... 303/113.5
5,584,540  12/1996 Takeuchi et al. ............... 303/116.1

*Primary Examiner*—Lee W. Young
*Attorney, Agent, or Firm*—Nikaido, Marmelstein, Murray & Oram LLP

[57] ABSTRACT

An antilock brake control device installed across two independent brake circuits in which brake lines connect the master cylinder to the wheel cylinders of wheel brakes of diagonal front and rear wheels, in which for each brake circuit, a first brake line 21 connects the master cylinder to the wheel cylinders 141, 144 of the front wheels, first selector valve 24 is installed in each the first brake line 21, second brake line 22 connects the wheel cylinders 142, 143 of the rear wheels and the first brake line 21, second selector valve 25 is installed in the second brake line, reflux channel 23 connects the first brake line and the second brake line, and a hydraulic pump 26 is installed in the reflux line.

2 Claims, 5 Drawing Sheets

VEHICLE ANTILOCK BRAKE CONTROL DEVICE

BACKGROUND OF THE INVENTION

This invention relates to an antilock brake control system (ABS) for vehicles.

As shown in FIG. 4, one example of a conventional antilock brake control device used in a diagonal brake line configuration is a four-channel system that uses eight selector valves (four as pressure increase valves 41 and four as pressure reduction valves 42) and two auxiliary reservoirs 43.

Or, as shown in FIG. 5, another device is a two-channel system that uses four selector valves (two pressure increase valves 41 and two pressure reduction valves 42) and two auxiliary reservoirs 43.

FIG. 6 shows another brake control system, invented by the present applicant, which uses six selector valves 44 and two auxiliary reservoirs 43 (see Publication of Unexamined Patent Application Heisei 3 (1991)-169769). In order to reduce the number of selector valves, other devices use two-position-three-way or three-position-three-way valves that combine both pressure increase and pressure reduction functions.

Conventional antilock braking control devices for diagonal brake lines have the following problems:

1. A four-channel system uses eight selector valves and two auxiliary reservoirs, hence the device is large, heavy, and expensive.
2. A two-channel system can eliminate the use of four of the selector valves, but it still requires two auxiliary reservoirs. Moreover, in a configuration where a front wheel and a diagonally opposite rear wheel are connected by a brake line, the rear wheel may lock before the front wheel. For example, the vehicle may straddle two different surfaces with the right wheels on dry pavement and the left wheels on ice. If the device senses that the left rear wheel is about to lock with the application of a low brake pressure, it will reduce the brake pressure of the wheel. However, the brake pressure of the right front wheel reduces simultaneously, in which case, the braking force is reduced and the stopping distance is extended. Conversely, if the brake pressure of the right front wheel were to be increased to shorten the stopping distance, then the left rear wheel would lock, making the vehicle unstable.
3. The previously-described brake control system as invented by the applicant uses six selector valves and two auxiliary reservoirs. This system does resolve the problems of the above-described two-channel system, but is larger, heavier, and more expensive.
4. Two-position-three-way and three-position-three-way valves are themselves large, heavy, and expensive.
5. Should the seals of the pressure reduction valves and the seals of the inlet and outlet check valves of the hydraulic pump degenerate, brake fluid from the main brake line may flow into the auxiliary reservoir. This will cause the brake pedal stroke to increase.

BRIEF DESCRIPTION OF THE INVENTION AND OBJECTIVES

The objective of this invention is to provide an antilock brake control device that requires fewer components and is therefor smaller, lighter, and cheaper, and which will provide greater performance and better vehicle stability.

This invention is a novel vehicle antilock brake control device to be installed across two independent brake circuits in which brake lines connect the master cylinder to the wheel cylinders of the wheel brakes of diagonal front and rear wheels. It is composed of a first brake line that connects the master cylinder to the wheel cylinders of the front wheels, a first selector valve installed in the first brake line, a second brake line on the side of the first selector valve that connects the wheel cylinders of the rear wheels and the first brake line, a second selector valve installed in the second brake line, a reflux line connected between the second brake line on the downstream side of the second selector valve and the first brake line on the upstream side of the first selector valve, and a hydraulic pump, installed in the reflux line, which returns brake fluid from the second brake line side to the first brake line side.

Further, the vehicle antilock brake control device of this invention is equipped with electronic control circuits that can control the flow of brake fluid into each wheel cylinder relative to the amount of brake fluid being drawn from each wheel cylinder by the hydraulic pump, and that can control the opening and closing of the first selector valve and second selector valve in order to independently control the brake pressure of the wheel cylinder of a front wheel and rear wheel connected by a brake line.

Moreover, the vehicle antilock brake control device is equipped with a motor to drive the hydraulic pump, and electronic control circuits that control the speed of the motor.

This invention provides the following advantages.

1. Only four selector valves are used, and no auxiliary reservoir is required; hence the device is cheaper, smaller, and lighter.
2. Only four selector valves are used, hence the number of electronic circuit components can be reduced, making the device cheaper.
3. The selector valves are positioned in brake lines connecting the front wheel to a rear wheel; hence good antilock control can be performed even on road surfaces with a variable coefficient of friction.
4. The elimination of auxiliary reservoirs removes the possibility of leakage of brake fluid into the auxiliary reservoirs, thereby eliminating any increase in the brake pedal stroke, and thus improving safety of the vehicle.
5. No 2-position-2-way valve or 3-position-3-way valve is used, thus making the device smaller, lighter, and cheaper.

BRIEF DESCRIPTION OF THE FIGURES

The above and other objects and the attendant advantages of the present invention will become readily apparent by reference to the following detailed description when considered in conjunction with the accompanying drawings wherein.

DETAILED DESCRIPTION OF THE INVENTION AND OF THE PREFERRED EMBODIMENT

An example of this invention is explained next using the attached diagrams.

Figure 1:
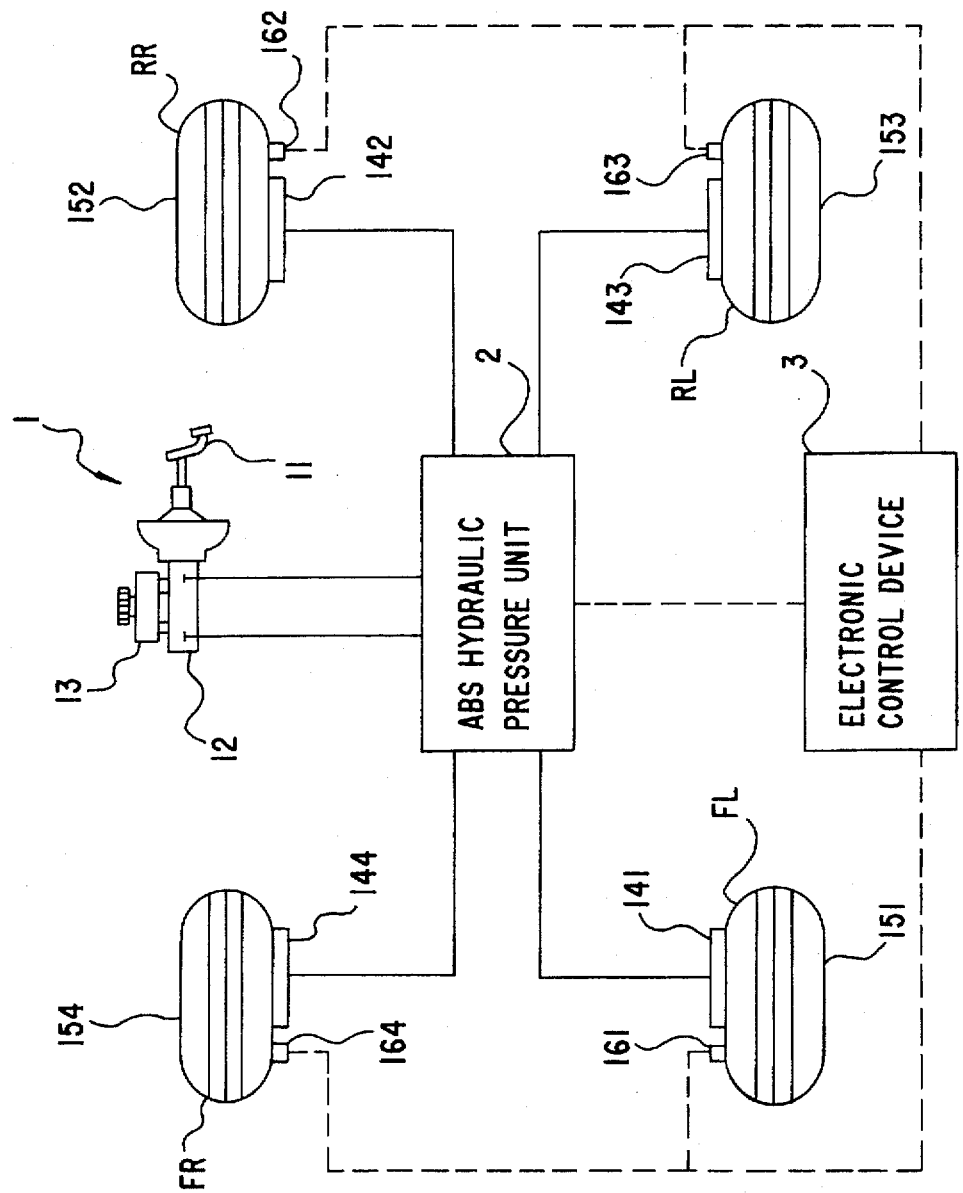
FIG. 1 is a conceptual diagram of an antilock brake control device.

A. Antilock brake control device (FIG. 1)

During normal braking, when the driver presses the brake pedal 11, brake pressure generated from the main reservoir 13 and the master cylinder 12 is applied via an ABS hydraulic pressure unit 2 to the respective wheel cylinder 141, 142, 143 and 144 of each wheel (left front, right rear, left rear, right front) 151, 152, 153 and 154 to brake the vehicle. Should the brake pedal be pushed hard, causing the wheel to lock, then the ABS device is activated to prevent the locking. For this, the electronic control device 3, based on signals from each wheel speed sensor 161–164, operates the ABS hydraulic pressure unit 2 to control the braking of each wheel 151–154. The electronic control device 3 can be made from a specialized hardware device, or can be composed of an input device, processor, and output device, such as a general computer.

Figure 2:
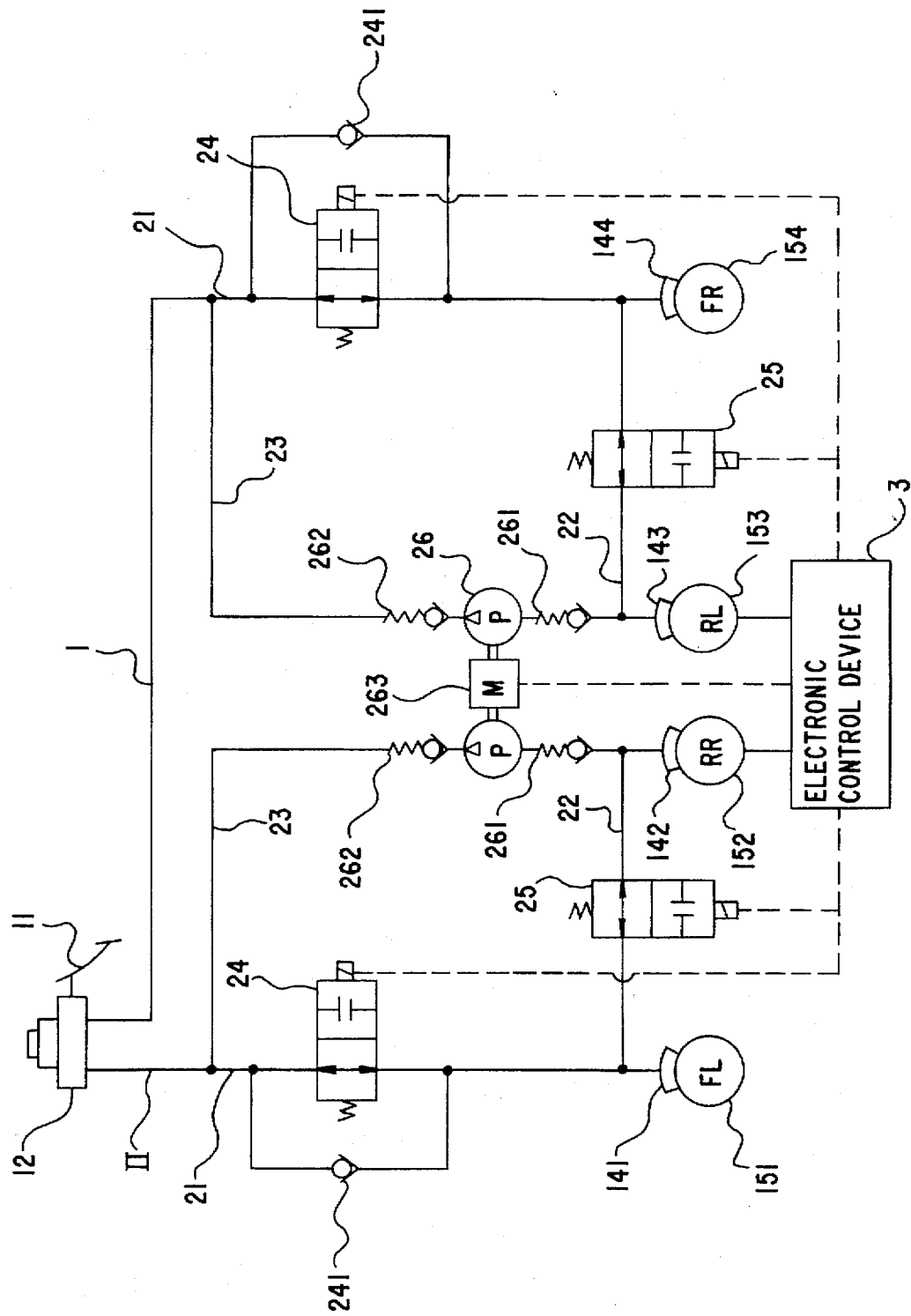
FIG. 2 illustrates the brake circuits connecting the four wheels.

B. Brake circuits (FIG. 2)

There are two independent brake circuits, circuit I and circuit II, in which brake lines connecting the master cylinder 12 to the respective wheel cylinders 141–144 of each wheel 151–154, are configured diagonally to link the right front wheel to the left rear wheel, and the left front wheel to the right rear wheel. That is in each circuit, a first brake line 21 connects the master cylinder 12 to the wheel cylinders 141, 144 of the left front wheel 151 and right front wheel 154 respectively. A first selector valve 24, installed in the first brake line 21, controls the amount of brake fluid supplied to the wheel cylinders 141, 144. Check valve 241 is arranged parallel to the first selector valve 24, and functions to discharge excess brake fluid from the wheel cylinders.

On the wheel cylinder side of the first selector valve 24, a second brake line 22 connects the first brake line 21 to the wheel cylinders 142, 143 of the right rear wheel 152 and left rear wheel 153 respectively. A second selector valve 25, installed in the second brake line 22, opens and closes the line between the front wheel and the rear wheel.

A reflux line 23 is connected between the rear wheel cylinder side of the second selector valve 25 in the second brake line 22 and the master cylinder side of the first selector valve 24 in the first brake line 21. A hydraulic pump 26 is positioned within the reflux line 23 to circulate brake fluid back from the second brake line side to the first brake line side. Each hydraulic pump 26 is driven and controlled by a common motor 263. The inlet check valve 261 and outlet check valve 262 are the suction valve and discharge valve respectively of the hydraulic pump. Note that a pressure reduction chamber can be set on the exit side of the hydraulic pump.

Next, the operation of the antilock brake control device is explained.

C. Operation under normal braking

During normal braking, in both circuit I and circuit II, both first selector valves 24 and second selector valves 25 are open. When the driver presses the brake pedal 11, brake pressure is generated at the master cylinder 12. The brake pressure is applied through the first selector valves 24 to the wheel cylinders 141, 144 of the left front and right front wheels 151, 154 respectively; and via the second selector valves 25 to the wheel cylinders 142, 143 of the right rear and left rear wheels 152, 153 respectively. This action applies normal braking to the front wheel and rear wheels respectively. During this action, the motor 263 and hydraulic pump 26 are not operating.

D. Operation under antilock brake control

In an antilock control action, in both Line I and Line II command signals from the electronic control device 3 operate motor 263 and hydraulic pump 26 and control the opening and closing of the first selector valve 24 and the second selector valve 25. Brake fluid from the wheel cylinders 141, 144 of the front wheel is returned via the second selector valve 25 through the reflux line 23 to the master cylinder, and brake fluid from the wheel cylinders 142, 143 of the rear wheels is drawn in directly by the hydraulic pump 26 and returned through the reflux line 23 to the master cylinder side. Subsequently, brake fluid from the master cylinder side is supplied to the wheel cylinders of the front wheels via the first selector valve 24 and to the wheel cylinders 142, 143 of the rear wheels via the second selector valve 25.

E. Pressure increase of front wheels and rear wheels

The brake pressure of the wheel cylinders 141, 144 of the front wheels is increased by opening the respective first selector valve 24 to enable an inflow of brake fluid. Similarly, the pressure at the rear wheels is increased by opening the second selector valve 25 to supply brake fluid to the wheel cylinders 142, 143 of the rear wheels. In this case, inflow of brake fluid from first selector valve 24 becomes greater than the outflow from the second selector valve 25. The opening and closing of the first selector valve 24 and the second selector valve 25 are controlled such that the brake fluid flowing from the second selector valve 25 is greater than the discharge from the hydraulic pump 26.

F. Pressure increase of front wheels and pressure reduction of rear wheels.

To increase the brake pressure of the front wheels, first selector valve 24 is opened to allow an inflow of brake fluid to the front wheels, and second selector valve 25 is closed to block the discharge of brake fluid. In this case, brake fluid from the rear wheels is discharged by the hydraulic pump 26, wherein the brake pressure at the rear wheels is reduced. To lessen this reduction of the brake pressure rear wheels, second selector valve 25 is opened and closed to enable the inflow of a small amount of brake fluid. That is, although the front and rear wheels are connected by a brake line, the brake pressure of the wheel cylinder at the rear wheel can be reduced separately from the brake pressure of the front wheel, thereby resolving the problem of the conventional 2-channel control system described previously. Section J below is to explain this control action should the vehicle be straddling a variable road surface where the coefficient of friction is not uniform.

G. Pressure reduction of front wheels

Brake pressure of the front wheels is reduced as follows. First selector valve 24 is closed to block an inflow of brake fluid. Meanwhile second selector valve 25 is opened to transmit brake fluid to the reflux line 23, then discharged by the hydraulic pump 26. At this time, the brake pressure of the rear wheel is controlled to be equivalent to or less than the brake pressure of the front wheel.

I. Maintaining the brake pressure of the front and rear wheels

To maintain the brake pressure of both the front and rear wheels, first selector valve 24 and second selector valve 25 are opened and closed to allow brake fluid to flow in an amount equivalent to that being discharged by the hydraulic pump 26. To maintain the pressure of either the front or the rear wheels, first selector valve 24 and second selector valve 25 are opened and closed in a manner to generate the required pressure at each of the wheel cylinders 141–144.

J. Braking control on road surfaces with a variable coefficient of friction

A given road surface may have a variable coefficient of friction. For example, the right wheels of the vehicle may be on dry pavement while the left wheels may be on ice. In this case, the left rear wheel 143 could lock if the brake pedal is pressed lightly, and to prevent this, the brake pressure is reduced. The second selector valve 25 is closed to block the inflow of brake fluid. This control action will prevent the left wheel from locking, thereby keeping the vehicle stable, but does not simultaneously reduce the pressure of the front wheel, thereby enabling a braking force to brake the vehicle.

Alternatively, the second selector valve 25 is opened and closed to suppress the inflow of brake fluid, and first selector valve 24 is opened and closed to supply brake fluid from the first selector valve 24 to increase the pressure of the right front wheel 154. This control of the two valves will prevent the rear wheel from locking and increase the braking force of the front wheel.

Figure 3:
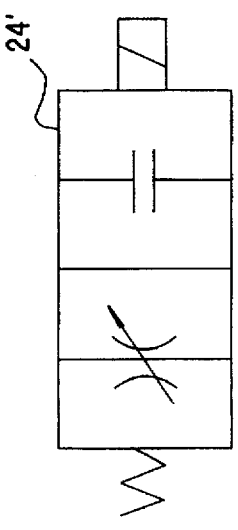
FIG. 3 illustrates another type of selector valve.
Figure 4:
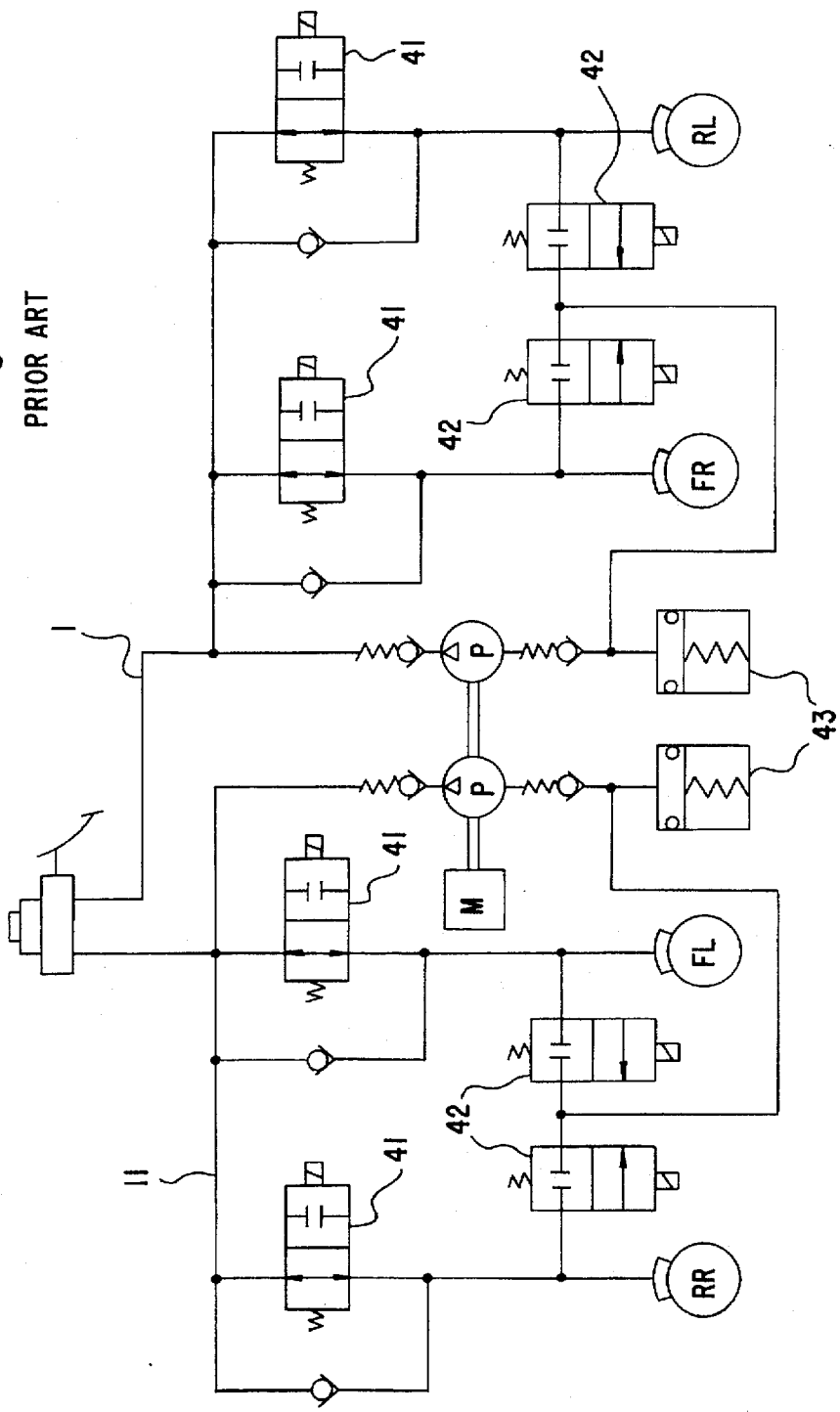
FIG. 4 illustrates a conventional 4-channel control system.
Figure 5:
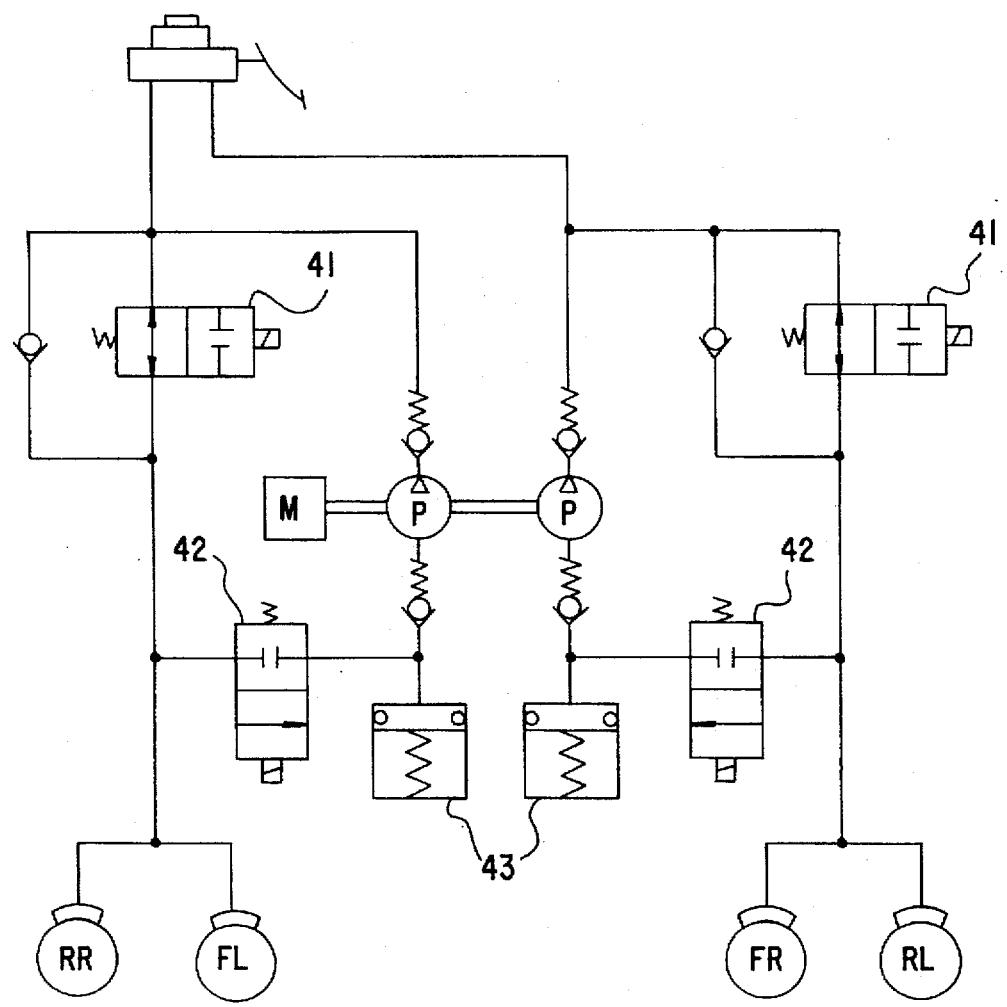
FIG. 5 illustrates a conventional 2-channel control system.
Figure 6:
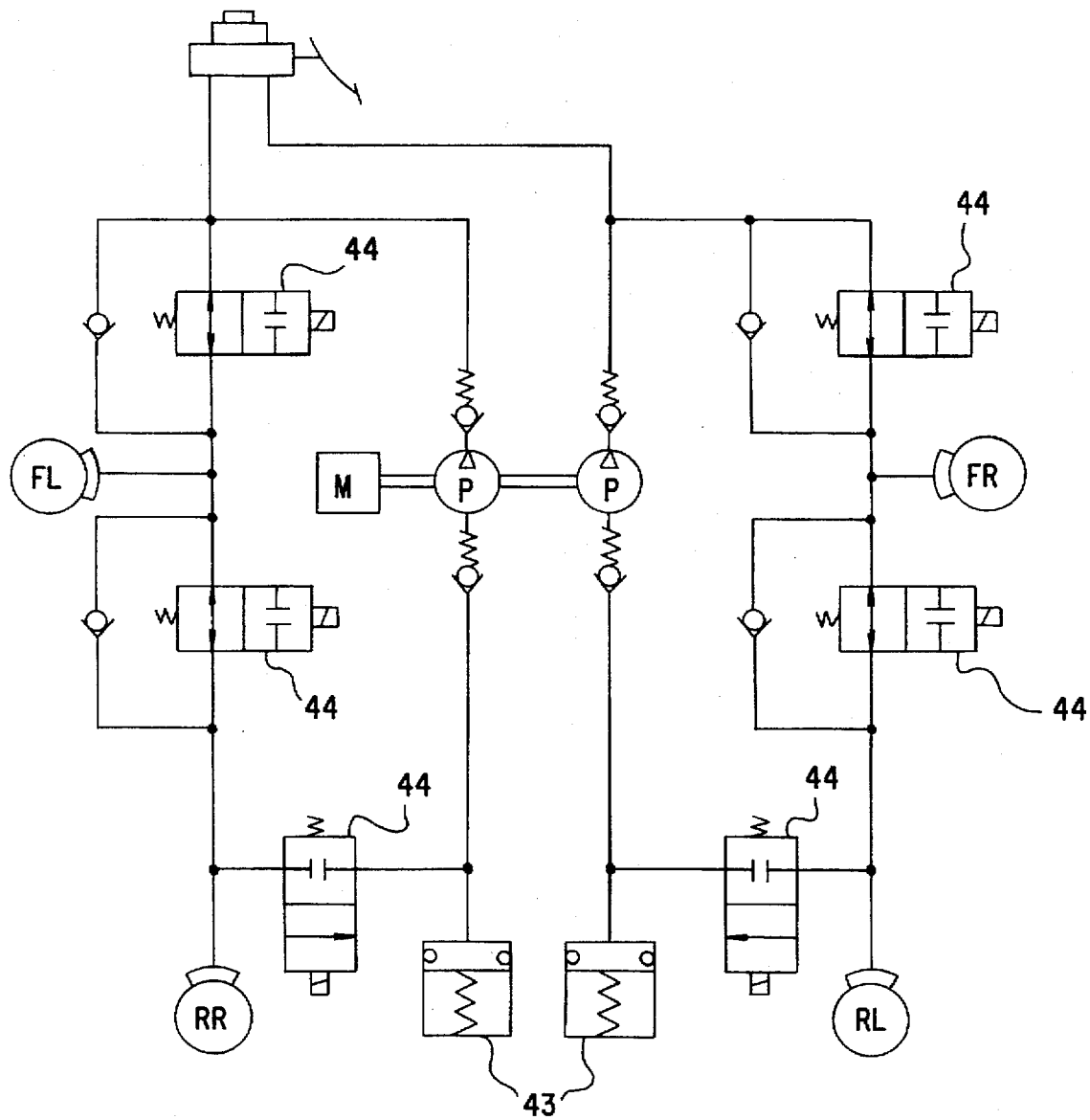
FIG. 6 illustrates a conventional brake control system that uses six selector valves.

It is noted that in FIG. 1, the selector valve is a two-position-two-way solenoid valve that can be switched from the open to the closed state, but the valve is not restricted to such a type. For example, as shown in FIG. 3, a flow control solenoid valve 24' in which the area of the fluid channel can be varied can be used.

Moreover, during an antilock control, the motor speed can be varied to control the intake of the hydraulic pump. This will broaden the range over which the speed of a pressure increase or reduction can be adjusted, thereby improving performance.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A vehicle antilock brake control system comprising:

two independent brake circuits for connecting a master cylinder to wheel cylinders of a wheel brake of respective diagonal front and rear wheels, each circuit including only two selector valves, a first brake line that connects the master cylinder to the wheel cylinder of a front wheel having one of said only two selector valves installed in said first brake line, a second brake line on a wheel cylinder side of said one selector valve that connects from said first brake line to a wheel cylinder of a rear wheel having the other of said only two second selector valves installed in said second brake line, a reflux line connected between said second brake line on a wheel cylinder side of said other selector valve and said first brake line on a master cylinder side of said one selector valve, and a hydraulic pump, installed in said reflux line, for returning brake fluid from said second brake line to said first brake line; and an electronic control circuit for controlling flow of brake fluid into each wheel cylinder relative to an amount of brake fluid being drawn from each wheel cylinder by each of said hydraulic pumps, and for controlling opening and closing of each of said selector valves to control individually brake pressure of each of the wheel cylinders of the respective front wheel and the rear wheel connected thereto by said second brake lines.

2. A vehicle antilock brake control system as claimed in claim 1, further comprising a motor to drive said hydraulic pumps, and wherein said electronic control circuit controls the speed of said motor.

* * * * *